US011469589B2

(12) United States Patent
Li et al.

(10) Patent No.: US 11,469,589 B2
(45) Date of Patent: Oct. 11, 2022

(54) ZERO SEQUENCE CURRENT BASED LINE DIFFERENTIAL PROTECTION SOLUTION

(71) Applicant: Hitachi Energy Switzerland AG, Baden (CH)

(72) Inventors: YouYi Li, Västerås (SE); Kai Liu, Beijing (CN); Jianping Wang, Västerås (SE)

(73) Assignee: Hitachi Energy Switzerland AG, Baden (CH)

( * ) Notice: Subject to any disclaimer, the term of this patent is extended or adjusted under 35 U.S.C. 154(b) by 15 days.

(21) Appl. No.: 16/956,348

(22) PCT Filed: Dec. 20, 2017

(86) PCT No.: PCT/EP2017/083827
§ 371 (c)(1),
(2) Date: Jun. 19, 2020

(87) PCT Pub. No.: WO2019/120518
PCT Pub. Date: Jun. 27, 2019

(65) Prior Publication Data
US 2020/0335967 A1    Oct. 22, 2020

(51) Int. Cl.
*H02H 7/22* (2006.01)
*H02H 1/00* (2006.01)

(52) U.S. Cl.
CPC .......... *H02H 7/226* (2013.01); *H02H 1/0007* (2013.01)

(58) Field of Classification Search
CPC ............... H02H 7/226; H02H 1/0007

USPC ........................................................ 361/87
See application file for complete search history.

(56) References Cited

U.S. PATENT DOCUMENTS

| 4,275,429 | A | * | 6/1981 | Church | H02H 1/0084 361/87 |
| 4,398,232 | A |   | 8/1983 | Elmore | |
| 4,538,196 | A |   | 8/1985 | Sun et al. | |
| 4,725,914 | A | * | 2/1988 | Garitty | H02H 7/263 361/87 |
| 4,819,119 | A | * | 4/1989 | Wilkinson | H02H 3/343 361/84 |

(Continued)

FOREIGN PATENT DOCUMENTS

| CN | 101673941 A | 3/2010 |
| CN | 101741070 A | 6/2010 |
| CN | 106655115 A | 5/2017 |

*Primary Examiner* — Thienvu V Tran
*Assistant Examiner* — Sreeya Sreevatsa
(74) *Attorney, Agent, or Firm* — Slater Matsil, LLP (57) ABSTRACT

An arrangement and method for zero sequence differential protection of a transmission line of a power system are disclosed. A zero sequence differential protection unit is configured to detect an internal fault of the transmission line using current measurements of each phase A, B, C of the transmission line. The zero sequence differential protection unit is configured to initiate a trip when an internal fault is detected. A phase selection unit is configured to determine whether or not any of the phases A, B, C of the transmission line is faulty using a comparison of differential values of the current measurements for each phase. The phase selection unit is configured to, based on the initiation of the trip, determine which of the phases A, B, C is faulty and to finalize the trip for any faulty phase.

20 Claims, 5 Drawing Sheets

(56) References Cited

U.S. PATENT DOCUMENTS

| | | | |
|---|---|---|---|
| 5,515,227 A * | 5/1996 | Roberts | H02H 3/343 |
| | | | 361/78 |
| 5,838,525 A | 11/1998 | Ward et al. | |
| 6,518,767 B1 | 2/2003 | Roberts et al. | |
| 6,525,543 B1 | 2/2003 | Roberts et al. | |
| 11,022,655 B2 * | 6/2021 | Liu | H02H 7/26 |
| 2007/0070565 A1 * | 3/2007 | Benmouyal | H02H 3/283 |
| | | | 361/62 |
| 2009/0088989 A1 * | 4/2009 | Guzman-Casillas | |
| | | | G01R 31/088 |
| | | | 702/58 |

* cited by examiner

ZERO SEQUENCE CURRENT BASED LINE DIFFERENTIAL PROTECTION SOLUTION

CROSS-REFERENCE TO RELATED APPLICATIONS

This patent application is a national stage filing of International Application No. PCT/EP2017/083827, filed on Dec. 20, 2017 and published as WO 2019/120518A1, which application is hereby incorporated by reference in its entirety.

TECHNICAL FIELD

Embodiments presented herein relate to an arrangement, method, and computer program for zero sequence differential protection of a transmission line of a power system.

BACKGROUND

Transmission lines are a vital part of the electrical distribution system, as they provide the path to transfer power between generation and load. Transmission lines are ideally tightly interconnected for reliable operation. Factors like de-regulated market environment, economics, right of-way clearance and environmental requirements have pushed utilities to operate transmission lines close to their operating limits. Any fault, if not detected and isolated quickly will cascade into a system wide disturbance causing widespread outages for a tightly interconnected system operating close to its limits. Transmission protection systems are designed to identify the location of faults and isolate only the faulted section. The key challenge to the transmission line protection lies in reliably detecting and isolating faults compromising the security of the system.

The high level factors influencing line protection include the criticality of the line (in terms of load transfer and system stability), fault clearing time requirements for system stability, line length, the system feeding the line, the configuration of the line (the number of terminals, the physical construction of the line, the presence of parallel lines), the line loading, the types of communications available, and failure modes of various protection equipment. The more detailed factors for transmission line protection directly address dependability and security for a specific application. The protection system selected should provide redundancy to limit the impact of device failure, and backup protection to ensure dependability. Reclosing may be applied to keep the line in service for temporary faults, such as lightning strikes. The maximum load current level will impact the sensitivity of protection functions, and may require adjustment to protection functions settings during certain operating circumstances. Single-pole tripping applications impact the performance requirements of distance elements, differential elements, and communications schemes. The physical construction of the transmission line is also a factor in protection system application. The type of conductor, the size of conductor, and spacing of conductors determines the impedance of the line, and the physical response to short circuit conditions, as well as line charging current. In addition, the number of line terminals determines load and fault current flow, which must to be accounted for by the protection system. Parallel lines also impact relaying, as mutual coupling influences the ground current measured by protective relays. The presence of tapped transformers on a line, or reactive compensation devices such as series capacitor banks or shunt reactors, also influences the choice of protection system, and the actual protection device settings.

The most widely used fault protection systems for transmission lines are current differential protection systems, which use only the electrical current value information from the power line. Current based line differential systems, also known as line differential systems, do not require voltage measuring devices, as they do not use voltage values in their fault determinations. Line differential systems are less sensitive to power swings and sudden load changes in the system and are generally less sensitive to or even immune from certain conditions on the line, including zero sequence mutual coupling effects and/or current reversals, among others. However, along with the advantages are several significant disadvantages, including reliance on high communication channel performance, which is required between the local and remote protective relays on the line. In addition, conventional line differential systems using phase current quantities are limited in their ground fault resistance coverage and also are a compromise to an extent in security under current transformer (CT) saturation conditions.

Zero sequence differential protection has very good sensitivity inherently, which is naturally suitable to handle the high impedance faults.

Although zero sequence differential protection has perfect sensitivity in theory, existing zero sequence protections also have some disadvantages. Firstly, the operate time delay is too long, typically, at least 100 ms and even longer. Secondly, existing phase selection mechanisms are not sensitive enough. It may have less sensitivity than the zero sequence differential relay in some fault cases, which may lead to unnecessary three-pole trips for single phase to ground faults.

Hence, there is still a need for improved zero sequence differential protection.

SUMMARY

An object of embodiments herein is to provide efficient zero sequence differential protection.

The present invention overcomes the above mentioned problems by providing a zero sequence differential protection scheme where a trip decision from a zero sequence differential protection unit triggers a phase selection unit.

In this respect, the term zero sequence differential protection might be regarded as short for zero sequence current based differential protection. Hence, the wording zero sequence differential protection as used hereinafter might be interpreted as zero sequence current based differential protection.

According to a first aspect there is presented an arrangement for zero sequence differential protection of a transmission line of a power system. The arrangement comprises a zero sequence differential unit configured for, using current measurements of each phase A, B, C of the transmission line, internal fault detection of the transmission line. The arrangement comprises a phase selection unit configured for, using a comparison of differential values of the current measures for each phase, determination of whether any of the phases A, B, C of the transmission line is faulty or not. A trip is caused by the zero sequence differential unit when an internal fault is detected by the zero sequence differential unit, and whereby the trip starts all the phases A, B, C for the phase selection unit to finalize the trip for said any faulty phase.

According to a second aspect there is presented method for zero sequence differential protection of a transmission line of a power system. The method comprises performing, by a zero sequence differential unit and using current measurements of each phase A, B, C of the transmission line, internal fault detection of the transmission line. The method comprises performing, by a phase selection unit configured for using a comparison of differential values of the current measures for each phase, determination of whether any of the phases A, B, C of the transmission line is faulty or not. A trip is caused by the zero sequence differential unit when an internal fault is detected by the zero sequence differential unit, and whereby the trip starts all the phases A, B, C for the phase selection unit to finalize the trip for said any faulty phase.

According to a third aspect there is presented a computer program for zero sequence differential protection of a transmission line of a power system, the computer program comprising computer program code which, when run on an arrangement according to the first aspect, causes the arrangement to perform a method according to the second aspect.

According to a fourth aspect there is presented a computer program product comprising a computer program according to the third aspect and a computer readable storage medium on which the computer program is stored. The computer readable storage medium could be a non-transitory computer readable storage medium.

Advantageously this provides efficient zero sequence differential protection.

Advantageously this provides zero sequence differential protection that is faster than existing mechanisms for zero sequence differential protection.

Advantageously this provides zero sequence differential protection that is more sensitive than existing mechanisms for zero sequence differential protection.

Advantageously this provides zero sequence differential protection that avoids unnecessary 3-phase trips.

Advantageously the proposed zero sequence differential protection enables for easy of implementation on existing differential protection devices.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

The embodiments disclosed herein relate to mechanisms for a zero sequence current differential line protection in a power system 100. In order to obtain such mechanisms there is provided an arrangement 200, a method performed by the arrangement 200, a computer program product comprising code, for example in the form of a computer program, that when run on an arrangement 200, causes the arrangement 200 to perform the method.

Figure 1:
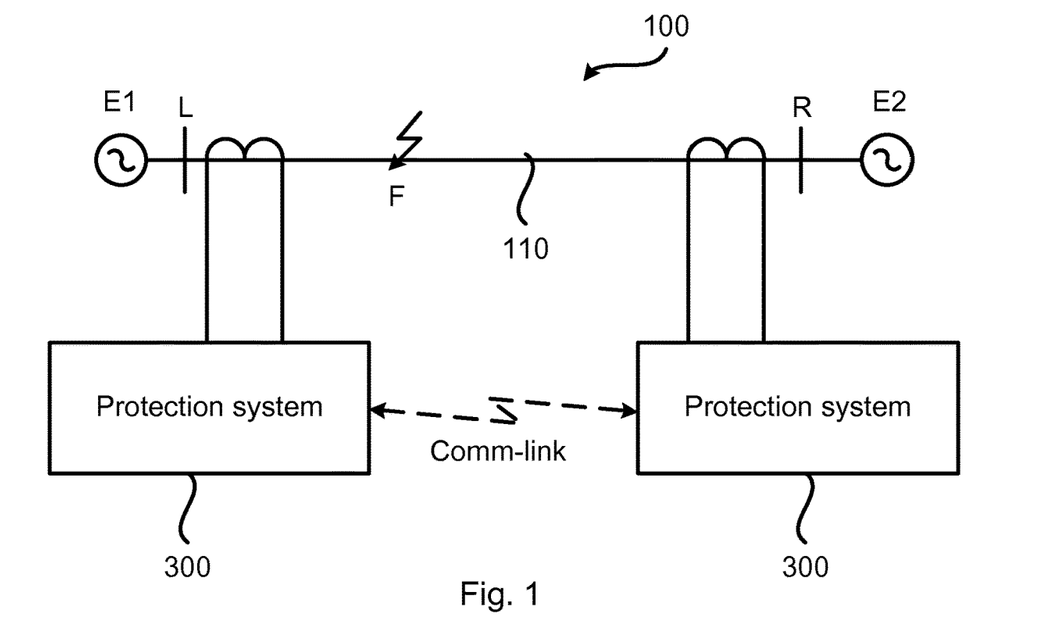
FIG. 1 is a schematic diagram of zero sequence current differential line protection.

A schematic diagram of a zero sequence current based differential line protection in a power system 100 is shown in FIG. 1. Current measurements are obtained from the terminals E1 and E2 of a transmission line 110. The transmission line 110 is assumed to have three current phases, hereinafter denoted A, B, C. Terminal E1 is assumed to be on a local (L) side whereas terminal E2 is assumed to be on a remote (R) side. A fault (F) is assumed to occur along the transmission line 110. A protection system 300 is provided at each of the remote side and the local side. As the skilled person understands, the power system 100 might have multiple terminals with respective transmission lines between each pair of terminals. For simplicity, but without loss of generality, the power system 100 will hereinafter be exemplified has having two terminals.

Figure 2:
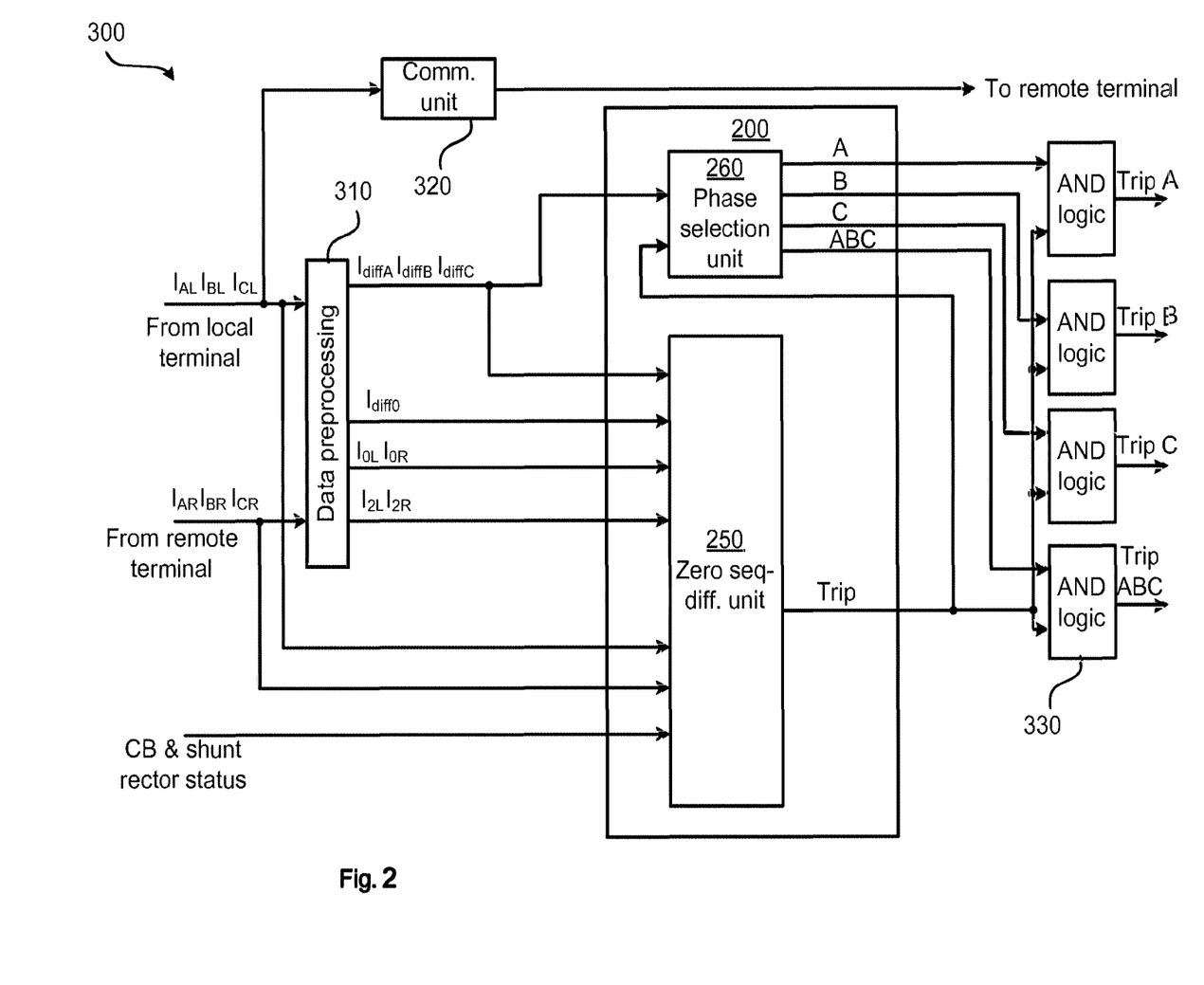
FIG. 2 schematically illustrates an arrangement according to an embodiment.

An embodiment of the protection system 300 is shown in FIG. 2.

In FIG. 2 the following notations of currents are used:

$I_{\phi L}$, denotes currents of phase $\phi$, where $\phi$=A, B, C, from the local terminal E1. $I_{\phi R}$ denotes currents of phase $\phi$, where $\phi$=A, B, C, from the remote terminal E2.

$I_{diff\phi}$, where $\phi$=A, B, C, is short for $I_{diff\phi}(t)$ and $I_{diff\phi}(t+T)$, where $I_{diff\phi}(t)$, is the differential current for phase $\phi$ and $I_{diff\phi}(t-T)$ is the differential current for phase $\phi$ with a time delay factor T. In some aspects the time delay factor T is dependent on the fundamental current period used in the power system 100. Particularly, according to an embodiment, T is identical to a fundamental current period of the transmission line 110. There could be fundamental current periods. In some power systems 100 the fundamental frequency current period is 50 Hz and in others it is 60 Hz. Therefore, according to an embodiment, T=(1/50) s=20 ms (for a 50 Hz power system), or T=(1/60) s=16.67 ms (for a 60 Hz power system).

$I0_L$ denotes the zero sequence differential current from the local terminal E1.

$I0_R$ denotes the zero sequence differential current from the remote terminal E2.

$I_{diff0}$ denotes the zero sequence differential current, $I_{diff0}=|I0_L+I0_R|$.

$I2_L$ denotes the negative current from the local terminal E1

$I2_R$ denotes the negative current from the remote terminal E2.

Further, "CB & shunt reactor status" denotes the operation status detector of CB (circuit breaker) and shunt reactor, which might be configured to aid the zero sequence current based differential protection to check if the change of zero sequence differential current is caused by a fault or the operation of a circuit breaker or shunt reactor.

The protection system 300 comprises an arrangement 200 for zero sequence differential protection of the transmission line 110 of the power system 100. In turn, the arrangement 200 comprises a zero sequence differential protection unit 250 and a phase selection unit 260.

In general terms, the zero sequence differential protection unit 250 is configured to detect any internal fault(s). The arrangement 200 thus comprises a zero sequence differential protection unit 250. The zero sequence differential protection unit 250 is configured for, using current measurements of each phase A, B, C of the transmission line 110, performing internal fault detection of the transmission line 110.

In general terms, the phase selection unit 260 is configured to select any faulted phase(s). The arrangement 200 thus comprises a phase selection unit 260. The phase selection unit 260 is configured for, using a comparison of differential values of the current measures for each phase, performing determination of whether any of the phases A, B, C of the transmission line 110 is faulty or not.

A trip is caused by the zero sequence differential protection unit 250 when an internal fault is detected by the zero sequence differential protection unit 250. The trip triggers the corresponding phase or phases A, B, C to, by the phase selection unit 260, be determined as faulty. Thus, a trip might be caused by the zero sequence differential protection unit 250 when it detects an internal fault, whereby the trip starts all the phases A, B, C. The phase selection unit 260 is then configured to finalize the trip for the faulty phase or phases.

In some aspects, a trip caused by the zero sequence differential protection unit 250, when an internal fault is detected by the zero sequence differential protection unit 250, triggers all the phases A, B, C to, by the phase selection unit 260, be determined as faulty. In FIG. 2 this will cause the output ABC from the phase selection unit 260 to be set to logic 1. That is, if there is no trip caused by the zero sequence differential protection unit 250, then the phase selection unit 260 will output any phase A, B, and/or C, determined as faulty by the phase selection unit 260 itself, where the corresponding output A, B, C is set to logic 1 for a faulty phase. But if there is a trip caused by the zero to sequence differential protection unit 250, then the phase selection unit 260 will indicate, by setting the output ABC to a logic 1, all phases as faulty.

In some aspects the internal fault is detected from disturbances of an external fault or from the operation of a circuit breaker or shunt reactor. In some aspects the trip starts the tripping logic of the corresponding phase or phases A, B, C and, by using the phase selection unit 260, the final faulty phase/phases will be tripped (Trip A or Trip B, Trip C as well as Trip ABC).

A data preprocessing unit 310 might be provided and configured for data preprocessing for other protection functions. A communications unit 320 might be provided and configured for communications with another arrangement 200. Logic AND gates 330 are configured to perform logic AND operations of logic input signals and thereby provide as output from the protection system 300 indications whether to trip any or all of the three phases A, B, C.

Figure 3:
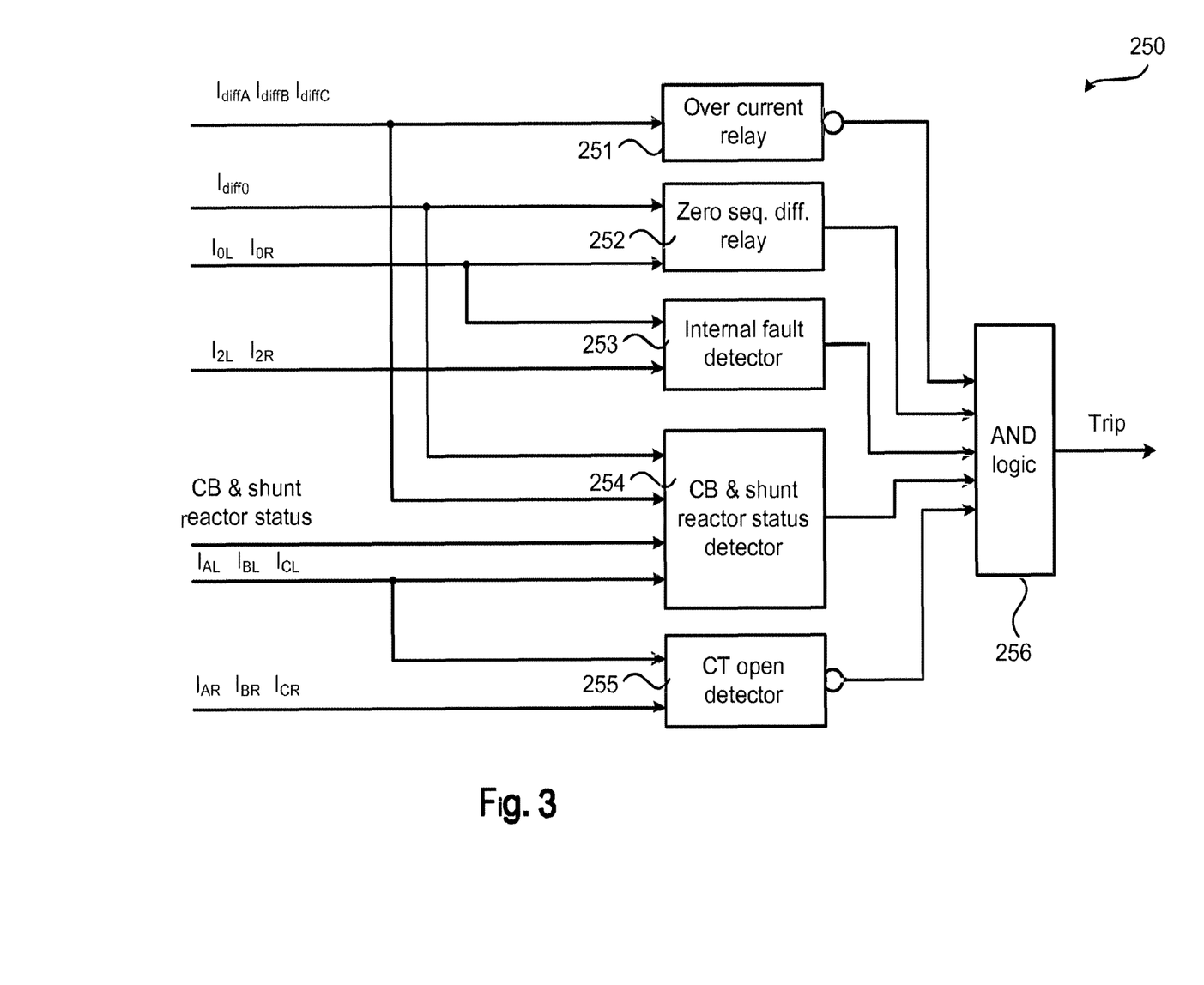
FIG. 3 schematically illustrates a zero sequence differential protection unit according to an embodiment.

An embodiment of the zero sequence differential protection unit 250 is shown in FIG. 3.

According to the embodiment of FIG. 3 the zero sequence differential protection unit 250 comprises an over current relay 251. The over current relay 251 is configured for controlling the zero sequence differential protection unit 250 to only detect internal faults with fault currents below a threshold current value. The over current relay 251 may thus be configured to ensure that the zero sequence differential protection unit 250 only operates for the fault cases with low fault currents (high impedance faults).

According to the embodiment of FIG. 3 the zero sequence differential protection unit 250 comprises a zero sequence differential relay 252. The zero sequence differential relay 252 is configured for internal fault detection by comparing the calculated zero sequence differential current with the restrain current. If the calculated zero sequence differential current is larger than the restrain current, it will treat the disturbance as an internal fault.

According to the embodiment of FIG. 3 the zero sequence differential protection unit 250 comprises an internal fault detector 253. The internal fault detector 253 is configured for internal fault detection by being configured to compare phase angles of zero sequence currents or negative sequence currents as being input to the zero sequence differential protection unit 250. Hence, the internal fault detector 253 may be configured to detect any internal fault by comparing the phase angles of the zero sequence currents or the negative sequence current. According to an embodiment the the internal fault detector 253 is configured to compare a phase angle difference between local current phasors and remote current phasors and thereby cooperate with the zero sequence differential relay 252 to enhance the security and reliability of the protection.

According to the embodiment of FIG. 3 the zero sequence differential protection unit 250 comprises a circuit breaker and shunt reactor status detector 254. The circuit breaker and shunt reactor status detector 254 is configured for avoidance of any mal-trip caused by operation of a circuit breaker or shunt reactor. In further detail, asymmetrical operation of circuit breakers or shunt reactors might produce zero sequence differential currents, which may lead to mal-trip in some cases if the operate time of the zero sequence differential protection is short enough. Thus, the disclosed zero sequence differential protection unit 250 will, by means of the circuit breaker and shunt reactor status detector 254, monitor the status of the circuit breakers and shunt reactors (which might comprise binary inputs of related breakers and/or directionality of analogue measurements). If it detects that the change is caused by the operation of circuit breakers or shunt reactor, it will block a comparably trip. But it will not block a delayed trip since the disturbance caused by circuit breakers or shunt reactors do not last for a comparably long time. The circuit breaker and shunt reactor status detector 254 is thus configured to detect any disturbance by the operation of circuit breaker or shunt reactor so as to avoid any mal-trip caused by the operation of circuit breaker or shunt reactor.

According to the embodiment of FIG. 3 the zero sequence differential protection unit 250 comprises a CT open detector 255. A CT open condition will create a zero sequence differential current so that it might result in false fault detection. The CT open detector 255 is configured to calculate differential current and restrained current for each phase to see if there is a condition of a CT open so that the zero sequence differential protection unit 250 will be blocked to avoid possible mal-operation because a CT open is a condition in the secondary circuit, which is not a primary transmission line fault.

Logic outputs are provided from the over current relay 251, the zero sequence differential relay 252, the internal fault detector 253, the circuit breaker and shunt reactor status detector 254, and the CT open detector 255 are provided and input to a logic AND gate 256. The outputs from the over current relay 251 and the CT open detector 255 are negated before being input to the logic AND gate 256. If all inputs to the logic AND gate 256 are 1, then a logic 1 will be set as output, denoting a trip.

Further aspects of the circuit breaker and shunt reactor status detector 254 will now be disclosed. For example, phase-separated differential currents might have different values between the disturbances of internal faults and asymmetrical breaker switching, which can be used to distinguish them.

For example, any or all of the phase separated differential currents might always equal or smaller than the normal charging current level during asymmetrical operation of the shunt reactor, if there is no internal fault. The differential currents of the faulted phase or phases might be much larger than the normal charging current level after the fault, if there is an internal fault. The basic criterion to be used by the circuit breaker and shunt reactor status detector 254 is therefore:

$$\begin{cases} |I_{L0} + I_{R0}| > k_1 \cdot I_{restrain0} \\ |I_{L0} + I_{R0}| > i_{dmin} \\ |I_{L\phi} + I_{R\phi}| > k_2 \cdot I_{charging} \end{cases}$$

Here, $I_{L0}$ and $I_{R0}$ are the zero sequence currents detected in local side and remote side respectively. $I_{restrain0}$ is the restrain current for the zero sequence differential relay 252, which may be $|I_{L0}-I_{R0}|$ or $|I_{L0}|+|I_{R0}|$, etc. Reliability to factors $k_1$ and $k_2$ are used to ensure security and reliability of the operation against measurement error, calculation error, charging current, noise, etc. As an example, $k_2$ might be larger than 1 (e.g. $k_2$=1.2).

Figure 4:
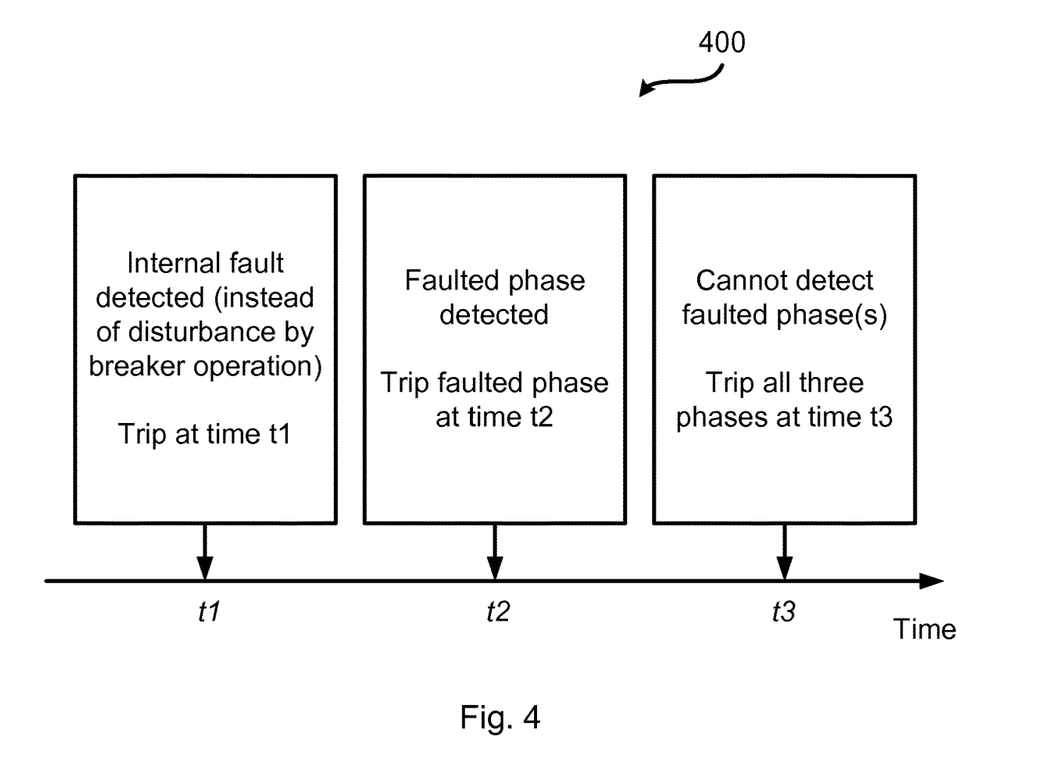
FIG. 4 schematically illustrates a three stage operating scheme according to an embodiment.

FIG. 4 illustrates a three stage operating scheme 400 that might be used by the zero sequence differential protection unit 250.

The protection will trip immediately (t1 could be set to zero (without time delay)), if the zero sequence differential protection unit 250 detects an internal fault and at the same time detects that this disturbance is caused by the internal fault and not by asymmetrical breaker operation of circuit breakers or shunt reactors.

If the zero sequence differential protection unit 250 cannot verify whether a fault indication is caused by operation of a circuit breaker or shunt reactor or a true internal fault, the zero sequence differential protection unit 250 will wait for some time (delay t2), such as in the order of too ms, to avoid the potential mal-trip. After the delay t2, the possible disturbance by asymmetrical breaker operation should be finished. If the zero sequence differential unit can still detect the internal fault after this delay and the phase selection unit 260 can detect the faulted phase at this time, it will trip the faulted phase or phases. Otherwise, if the zero differential relay continue to startup, but the fault selection unit cannot detect the faulted phase, it will finally trip three phases after a delay t3, such as in the order of 250 ms. Thus, according to an embodiment the arrangement 200 is configured to engage the zero sequence differential protection unit 250 at a point in time t1, and to engage the phase selection unit 260 at a point in time t3, where t3 occurs later than t1. According to an embodiment the arrangement 200 is configured to engage the circuit breaker and shunt reactor status detector 254 at a point in time t2, where t2 occurs later than t1 and where t2 occurs earlier than t3.

By means of the scheme in FIG. 4, the proposed the arrangement 200 can trip immediately in most of the fault cases. Only for cases when the fault impedance is too high for the relay to distinguish the internal fault and asymmetrical shunt reactor operation, it will wait for a longer operate time (t2 or t3) before making a trip decision. Thereby the proposed the arrangement 200 has a much faster operation speed than existing zero sequence current differential protection schemes.

The internal fault detector 253, or fault discriminator, might detects any internal/external fault(s) by calculating and comparing the phase angle difference between local current phasors and remote current phasors. Here, the currents may be negative sequence currents or zero sequence currents. One internal fault detection criterion is as follows.

Internal fault is detected either if:

$$\begin{cases} \arg\left(\dfrac{I_{L0}}{I_{R0}}\right) < \theta_{set} \\ |I_{L0}| > I_{set}, |I_{R0}| > I_{set} \end{cases}$$

or if:

$$\begin{cases} \arg\left(\dfrac{I_{L2}}{I_{R2}}\right) < \theta_{set} \\ |I_{L2}| > I_{set}, |I_{R2}| > I_{set} \end{cases}$$

Here, $I_{set}$ denotes a current threshold and $\theta_{set}$ denotes an angular threshold.

Figure 5:
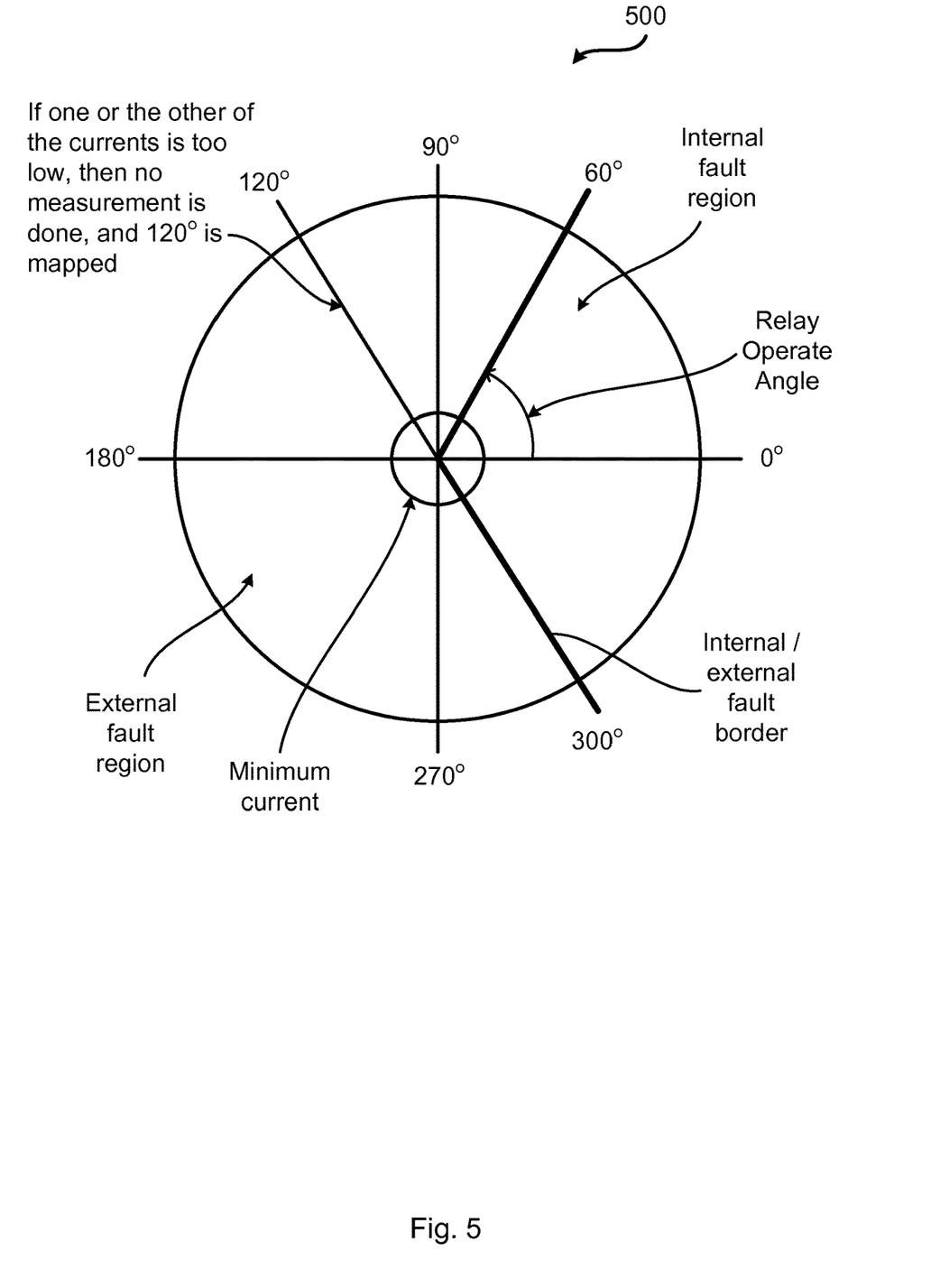
FIG. 5 schematically illustrates fault (internal faults or external faults) discrimination according to an embodiment.

A fault discriminator between internal faults and external faults of a negative sequence based methodology is illustrated at 500 in FIG. 5. Considering that there is a large margin between internal faults and external faults (o degrees versus 180 degrees), this fault discriminator has good reliability and security against the measurement errors, time synchronization errors or CT saturation.

Figure 6:
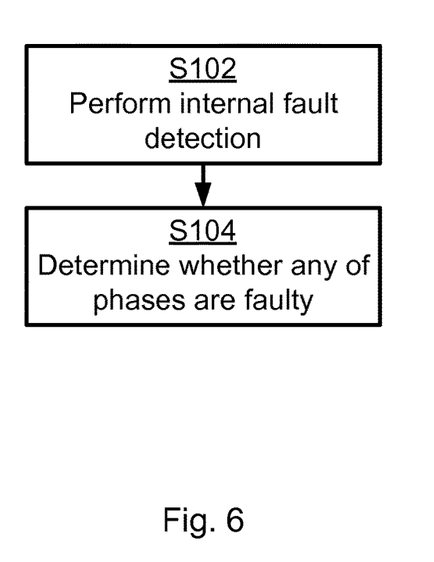
FIG. 6 is a flowchart of a method according to an embodiment.

FIG. 6 is a flowchart illustrating embodiments of methods for zero sequence differential protection of a transmission line 110 of a power system 100. The methods are performed by the arrangement 200. The methods are advantageously provided as computer programs 920.

S102: The zero sequence differential protection unit 250 uses current measurements of each phase A, B, C of the transmission line 110 to perform internal fault detection of the transmission line 110.

S104: The phase selection unit 260, as configured to use a comparison of differential values of the current measures for each phase, performs determination of whether any of the phases A, B, C of the transmission line 110 is faulty or not.

As disclosed above, a trip is caused by the zero sequence differential protection unit 250 when an internal fault is detected by the zero sequence differential protection unit 250. The trip triggers all the phases A, B, C to by the phase selection unit 260 be determined as faulty. Thus, a trip might be caused by the zero sequence differential protection unit 250 when it detects an internal fault, whereby the trip starts all the phases A, B, C. The phase selection unit 260 is then configured to finalize the trip for the faulty phase or phases.

Figure 7:
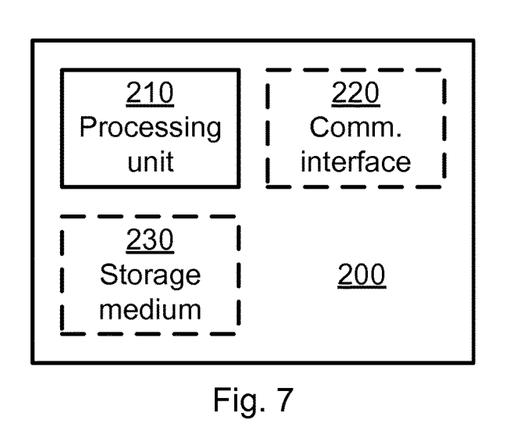
FIG. 7 shows functional units of an arrangement for zero sequence differential protection of a transmission line of a power system according to an embodiment.

FIG. 7 schematically illustrates, in terms of a number of functional units, the components of an arrangement 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 910 (as in FIG. 9), e.g. in the form of a storage medium 230. The processing circuitry 210 may further be provided as at least one application specific integrated circuit (ASIC), or field programmable gate array (FPGA).

Particularly, the processing circuitry 210 is configured to cause the arrangement 200 to perform a set of operations, or steps, S102-S104, as disclosed above. For example, the storage medium 230 may store the set of operations, and the processing circuitry 210 may be configured to retrieve the set of operations from the storage medium 230 to cause the arrangement 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The arrangement 200 may further comprise a communications interface 220 at least configured for communications with another arrangement 200; for receiving input and for providing output. As such the communications interface 220 may comprise one or more transmitters and receivers, comprising analogue and digital components. The processing circuitry 210 controls the general operation of the arrangement 200 e.g. by sending data and control signals to the communications interface 220 and the storage medium 230, by receiving data and reports from the communications interface 220, and by retrieving data and instructions from the storage medium 230. Other components, as well as the related functionality, of the arrangement 200 are omitted in order not to obscure the concepts presented herein.

Figure 8:
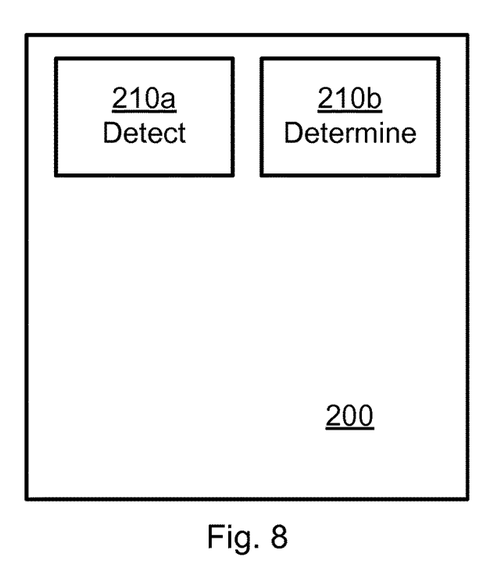
FIG. 8 shows functional modules of an arrangement for zero sequence differential protection of a transmission line of a power system according to an embodiment.

FIG. 8 schematically illustrates, in terms of a number of functional modules, the components of an arrangement 200 according to an embodiment. The arrangement 200 of FIG. 8 comprises a detect module 210a configured to perform step S102 and a determine module 210b configured to perform step S104. In general terms, each functional module 210a-210b may in one embodiment be implemented only in hardware and in another embodiment with the help of software, i.e., the latter embodiment having computer program instructions stored on the storage medium 230 which when run on the processing circuitry makes the arrangement 200 perform the corresponding steps mentioned above in conjunction with FIG. 9. It should also be mentioned that even though the modules correspond to parts of a computer program, they do not need to be separate modules therein, but the way in which they are implemented in software is dependent on the programming language used. Preferably, one or more or all functional modules 210a-210b may be implemented by the processing circuitry 210, possibly in cooperation with the communications interface 220 and/or the storage medium 230. The processing circuitry 210 may thus be configured to from the storage medium 230 fetch instructions as provided by a functional module 210a-210b and to execute these instructions, thereby performing any steps as disclosed herein.

The arrangement 200 may be provided as a standalone device or as a part of at least one further device. Thus, a first portion of the instructions performed by the arrangement 200 may be executed in a first device, and a second portion of the of the instructions performed by the arrangement 200 may be executed in a second device; the herein disclosed embodiments are not limited to any particular number of devices on which the instructions performed by the arrangement 200 may be executed. Hence, the methods according to the herein disclosed embodiments are suitable to be performed by an arrangement 200 residing in a cloud computational environment. Therefore, although a single processing circuitry 210 is illustrated in FIG. 7 the processing circuitry 210 may be distributed among a plurality of devices, or nodes. The same applies to the functional modules 210a-210b of FIG. 8 and the computer program 920 of FIG. 9 (see below).

In some aspects the arrangement 200 is part of an Intelligent Electronic Device (IED) such as a protective relay. Thus, according to an embodiment there is provided an IED comprising an arrangement 200 as herein disclosed. In some aspects the arrangement 300 is part of the IED.

Figure 9:
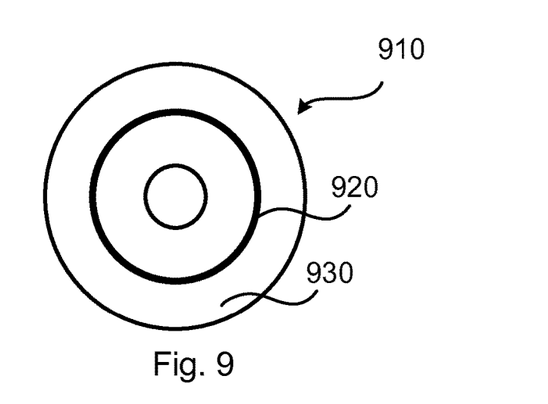
FIG. 9 shows a computer program product.

FIG. 9 shows one example of a computer program product 910 comprising computer readable storage medium 930. On this computer readable storage medium 930, a computer program 920 can be stored, which computer program 920 can cause the processing circuitry 210 and thereto operatively coupled entities and devices, such as the communications interface 220 and the storage medium 230, to execute methods according to embodiments described herein. The computer program 920 and/or computer program product 910 may thus provide means for performing any steps as herein disclosed.

In the example of FIG. 9, the computer program product 910 is illustrated as an optical disc, such as a CD (compact disc) or a DVD (digital versatile disc) or a Blu-Ray disc. The computer program product 910 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 920 is here schematically shown as a track on the depicted optical disk, the computer program 920 can be stored in any way which is suitable for the computer program product 910.

The inventive concept has mainly been described above with reference to a few embodiments. However, as is readily appreciated by a person skilled in the art, other embodiments than the ones disclosed above are equally possible within the scope of the inventive concept, as defined by the appended patent claims. For example, although the power system in FIG. 1 has two terminals E1 and E2, the herein disclosed embodiments are equally applicable to a power system 100 having multiple terminals.

The invention claimed is:

1. An arrangement for zero sequence differential protection of a transmission line of a power system, the arrangement comprising:

a zero sequence differential protection unit configured to detect an internal fault of the transmission line using current measurements of each phase A, B, C from a local terminal and a remote terminal of the transmission line, the zero sequence differential protection unit being configured to initiate a trip when an internal fault is detected; and a phase selection unit configured to determine whether or not any of the phases A, B, C of the transmission line is faulty using a comparison of differential values of the current measurements for each phase, wherein the phase selection unit is configured to, based on the initiation of the trip, determine which of the phases A, B, C is faulty and to finalize the trip for any faulty phase.

2. The arrangement according to claim 1, wherein the zero sequence differential protection unit comprises an over current relay configured to control the zero sequence differential protection unit to only detect internal faults with fault currents below a threshold current value.

3. The arrangement according to claim 1, wherein the zero sequence differential protection unit comprises a zero sequence differential relay configured to detect the internal fault by comparing a calculated zero sequence differential current with a restrain current.

4. The arrangement according to claim 1, wherein the zero sequence differential protection unit comprises an internal fault detector configured to detect the internal fault by comparing phase angles of zero sequence currents or negative sequence currents as being input to the zero sequence differential protection unit.

5. The arrangement according to claim 4, wherein the internal fault detector is configured to compare a phase angle difference between local current phasors and remote current phasors.

6. The arrangement according to claim 1, wherein the zero sequence differential protection unit comprises a circuit breaker and shunt reactor status detector configured to avoid any mal-trip caused by operation of a circuit breaker or shunt reactor by detecting disturbance caused by the operation of the circuit breaker or shunt reactor.

7. The arrangement according to claim 6, wherein the arrangement is configured to engage the zero sequence differential protection unit at a point in time t1 and to engage the phase selection unit at a point in time t3, where t3 occurs later than t1.

8. The arrangement according to claim 7, wherein the arrangement is configured to engage the circuit breaker and shunt reactor status detector at a point in time t2, where t2 occurs later than t1 and where t2 occurs earlier than t3.

9. The arrangement according to claim 1, wherein the arrangement is configured to engage the zero sequence differential protection unit at a point in time t1, and to engage the phase selection unit at a point in time t3, where t3 occurs later than t1.

10. The arrangement according to claim 1, wherein the arrangement is part of an intelligent electronic device (IED).

11. A method for zero sequence differential protection of a transmission line of a power system, the method comprising:

performing, by a zero sequence differential protection unit and using current measurements of each phase A, B, C from a local terminal and a remote terminal of the transmission line, internal fault detection of the transmission line; and performing, by a phase selection unit configured for using a comparison of differential values of the current measures for each phase, determination of whether any of the phases A, B, C of the transmission line is faulty or not, wherein a trip is initiated by the zero sequence differential protection unit when an internal fault is detected by the zero sequence differential protection unit and wherein the trip causes the phase selection unit to evaluate all the phases A, B, C to finalize the trip for any faulty phase.

12. The method according to claim 11, wherein the zero sequence differential protection unit is engaged at a point in time t1 and the phase selection unit is engaged at a point in time t3, where t3 occurs later than t1.

13. The method according to claim 11, wherein the zero sequence differential protection unit comprises a circuit breaker and shunt reactor status detector, the method further comprising avoiding any mal-trip caused by operation of a circuit breaker or shunt reactor by detecting any disturbance caused by the operation of the circuit breaker or shunt reactor.

14. The method according to claim 13, wherein the zero sequence differential protection unit is engaged at a point in time t1, the circuit breaker and shunt reactor status detector is engaged at a point in time t2, and the phase selection unit is engaged at a point in time t3, where t2 occurs later than t1 and t3 occurs later than t2.

15. A computer program product for zero sequence differential protection of a transmission line of a power system, the computer program comprising a non-transitory computer readable storage medium computer code which, when run on an arrangement that includes the zero sequence differential protection unit and the phase selection unit, causes the arrangement to perform the method of claim 11.

16. A method for zero sequence differential protection of a transmission line of a power system, the method comprising:

detecting an internal fault of the transmission line using current measurements of each phase A, B, C from a local terminal and a remote terminal of the transmission line;

initiating a trip when the internal fault is detected;

determining which of the phases A, B, C of the transmission line is faulty by comparing differential values of the current measurements for each phase; and finalizing the trip for any phase determined to be faulty.

17. The method according to claim 16, wherein detecting the internal fault comprises detecting only internal faults with fault currents below a threshold current value.

18. The method according to claim 16, wherein detecting the internal fault comprises comparing a calculated zero sequence differential current with a restrain current.

19. The method according to claim 16, wherein detecting the internal fault comprises comparing phase angles of zero sequence currents or negative sequence currents.

20. The method according to claim 16, wherein detecting the internal fault comprises detecting disturbance caused by operation of an circuit breaker or a shunt reactor to avoid any mal-trip caused by the operation of the circuit breaker or the shunt reactor.

* * * * *